L. POETON.
TEMPLE.
APPLICATION FILED SEPT. 13, 1917.
1,265,511.
Patented May 7, 1918.
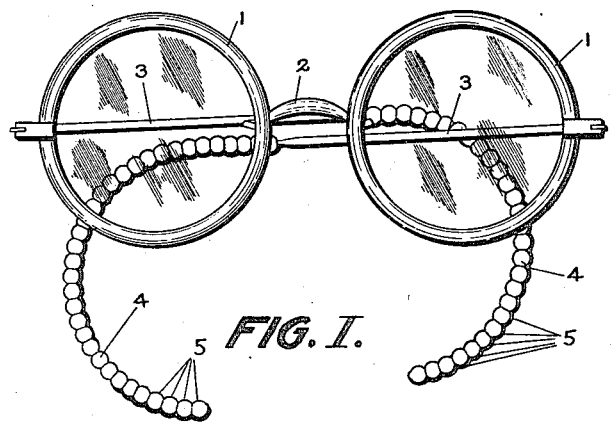
FIG. I.
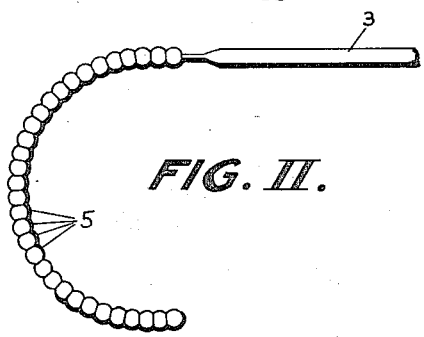
FIG. II.
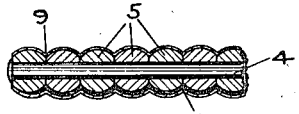
FIG. III.
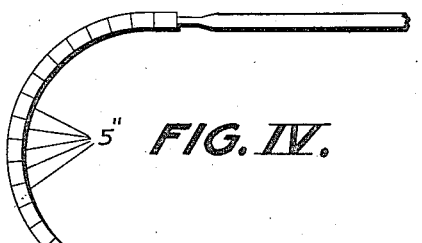
FIG. IV.
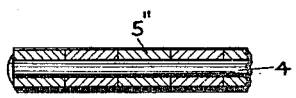
FIG. V.
FIG. VI.
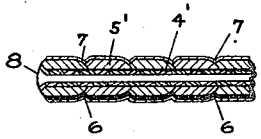
FIG. VII.
FIG. VIII.
FIG. IX.
INVENTOR
LAWRENCE POETON
BY
H. H. Styll   H. K. Parsons
ATTORNEYS

UNITED STATES PATENT OFFICE.

LAWRENCE POETON, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

TEMPLE.

1,265,511.        Specification of Letters Patent.      Patented May 7, 1918.

Application filed September 13, 1917. Serial No. 191,233.

*To all whom it may concern:*

Be it known that I, LAWRENCE POETON, a citizen of the United States, residing at Southbridge, in the county of Worcester and State of Massachusetts, have invented certain new and useful Improvements in Temples, of which the following is a specification.

This invention relates to new and useful improvements in spectacles and more particularly to an improved temple thereof.

The main object of the invention is the provision of a temple having the ear loop provided with a plurality of substantially cylindrical members arranged thereon, the surfaces of which are polished to prevent irritating, cutting or abrading the skin behind the ear.

Another object of the invention is to provide a casing for the ear loop of a temple which is composed of a plurality of substantially cylindrical sections which enlarge that portion of the loop that contacts with the ear, but at the same time does not decrease the flexibility of the loop.

It is well known in this art that the ear loop of a temple is made of fine wire or cable so that after wearing any length of time the same begins to cut and irritate the skin behind the ear. This has generally been prevented by the use of chamois, rubber or similar materials to enlarge and soften the contacting surface, but it has been found that these materials are very unsatisfactory as the wearing qualities of these are not very good. Therefore as heretofore stated my invention provides a casing for the ear loop which will do away with any discomforts usually experienced by having the plain loop contacting with the ear and at the same time this casing can be made from zylonite or a similar material.

A further object of the invention is the provision of a temple for spectacles of the above character which will possess advantages in points of efficiency and durability, is inexpensive to manufacture and at the same time is simple in its construction and operation.

With the above and other objects in view, the invention consists in the novel features of construction and the combination and arrangement of parts to be hereinafter more fully described, pointed out in the claims and shown in the accompanying drawings, in which Figure I is a front view of a pair of spectacles provided with temples embodying my invention.

Fig. II is a side elevation of an ear loop showing my invention as applied thereto.

Fig. III is a detail sectional view of that form of my invention illustrated in Fig. II.

Fig. IV is a side elevation of an ear loop illustrating another form of my invention.

Fig. V is a detail sectional view of the form shown in Fig. IV.

Fig. VI is a side elevation of an ear loop illustrating the preferred form of my invention, and Fig. VII is a detail sectional view of the preferred form of my invention as illustrated in Fig. VI.

Fig. VIII is a detailed sectional view of extreme end of the temple loop showing how the bead is secured onto the end of the temple, and Fig. IX is a longitudinal sectional view illustrating how the bead at the inner end of the loop is fastened, and also the one at the outer end of the loop.

Referring more particularly to the drawings which form a part of this application the numeral 1 designates the usual lens frames joined by the nose bridge 2 and hinged to the lens frames are the temples 3 provided with the usual ear loops 4. These loops are usually made of a single strand integrally formed with the temples, but they are also made of cable formation and in various other ways, but very small in circumference.

Arranged on these loops 4 are a plurality of loosely mounted members 5 of bead form as shown in Fig. II. In the general construction of my improved temple I prefer to have the members 5' cylindrical in form as shown in Figs. VI and VII and formed at one end with a substantial cup 6 and at its opposite end with an oval shaped head 7 adapted to fit into the cup 6 and provide a loosely fitting joint whereby the loop 4' may be easily bent into any desired shape and the members 5' will not decrease the flexibility of the same. Thus in placing these members on the loop 4' the head 7 is fitted into the cup 6 of the member in advance on the loop and after the last member is placed on the loop the terminal is flattened transversely thereof to provide a head as shown at 8 which retains the members in place upon the loop.

From the above it will be noted that I have provided a covering for the ear loops of temples whereby to enlarge and at the same time provide a smooth surface for protection of the ear by the same. The smooth surface is readily obtained by the dipping of these members in an acid solution which will tend to soften these members and at the same time produce a thin film to flexibly connect the members 5' where the head 7 and cup 6 join together.

In Fig. IV the members 5" are illustrated as of cylindrical form and loosely mounted on the loop so that the loop can be readily adjusted to any desired shape. It will be noted that there is sufficient longitudinal movement of these members 5" on the loop to permit of a free flexible movement of the loop and prevent any binding between the members. It will be noted from a glance at the sectional view in Fig. VII that the loop 4 is of the cable style so it can be readily seen that the loop upon which the members are mounted may be of either the plain or cable style.

In Figs. II and III the members 5 are bead shaped with opposed flattened surfaces as at 9 and are loosely mounted on the loop in the same manner as the members of the other forms of the invention hereinbefore referred to. From this it will be apparent that these members 5, 5' and 5" may be formed of various shapes and still be within the scope of my invention which merely pertains to a casing for the ear loop of a temple, comprising a plurality of members loosely mounted upon the ear loop to enlarge the same and prevent cutting or the irritation of the skin behind the ears.

In securing the end member on the loop it is preferred to subject the same to heat and press the same firmly into contact with the head 8 as shown in Fig. VIII so as to form the opposed grooves 10 which receive the head and thereby prevent any lateral or longitudinal movement of the member 11 upon the head. In applying pressure to the member 11 it forms the internal flanges 12 and 13 at the ends of the member to engage with the ends of the head to help securely hold the member in place upon the head, and thus form a smooth end for the loop.

In Fig. IX I have shown a slightly modified form of fastening means wherein the member 11' is arranged so that the outer end thereof is flush with the end of the loop and when pressure is brought to bear on the member 11' it will form the open ended grooves 14 to receive the head 8' and at the same time form the internal flange 15 which will thus securely hold the member in position on the head. It will be noticed that in placing the members in position on the ear loop they are fitted tightly together to prevent the hair of the wearer from becoming between the members but permitted to readily pass thereover.

While I have shown and described the preferred form of my invention it will be obvious that various changes in the details of construction and in the proportions may be resorted to for successfully carrying my invention into practice without sacrificing any of the novel features or departing from the scope of the appended claims.

In Fig. VIII I have illustrated the manner of fastening the member at the inner end of the loop and it consists of forming flattened triangular portions 14' over which the member is forced so that this portion 14' is embedded within the material of the member. The ends of the portion provide shoulders 15 which eliminates any possible longitudinal movement on the part of the member upon the loop.

One of the main features of my invention which has not as yet been set forth is that in the plain zylonite temples now in use the zylonite has a tendency to lose its shape when exposed to heat wherein by forming the temple hook with a metal core in the zylonite it will retain the hook in shape at all times.

I claim:

1. A casing for ear loops comprising a plurality of members loosely mounted upon said loops and a film flexibly connecting said members formed by the application of an acid to said members.

2. A casing for ear loops comprising a plurality of members loosely mounted upon said loops, said members each having a cup formed at one end thereof and a head portion formed at the other end adapted to fit into the cup of the member in advance.

3. A temple piece, an ear loop connected therewith, a plurality of members loosely mounted thereon, a flattened head at the end of the ear loop and the outermost of said members being forced over the flattened head to retain the same against movement thereon.

4. A temple piece, an ear loop connected therewith, a plurality of members loosely mounted thereon, a flattened head at the end of the ear loop, the outermost member of said members being forced over the flattened head to form oppositely disposed grooves to receive the head and flanges at each end of the member to engage the head.

In testimony whereof I have affixed my signature, in presence of two witnesses.

LAWRENCE POETON.

Witnesses:
E. M. HALVORSEN,
H. E. COLEMAN.